United States Patent

Haynes

(10) Patent No.: US 9,908,364 B2
(45) Date of Patent: Mar. 6, 2018

(54) VEHICLE WHEEL CENTER CAP ADAPTER

(71) Applicant: Joshua Haynes, Santee, CA (US)

(72) Inventor: Joshua Haynes, Santee, CA (US)

( * ) Notice: Subject to any disclaimer, the term of this patent is extended or adjusted under 35 U.S.C. 154(b) by 64 days.

(21) Appl. No.: 14/931,653

(22) Filed: Nov. 3, 2015

(65) Prior Publication Data

US 2016/0121647 A1 May 5, 2016

Related U.S. Application Data

(60) Provisional application No. 62/074,527, filed on Nov. 3, 2014.

(51) Int. Cl.
| | |
|---|---|
| *B60B 7/06* | (2006.01) |
| *B60B 7/00* | (2006.01) |
| *B60B 7/04* | (2006.01) |
| *B60B 7/20* | (2006.01) |
| *B60B 7/14* | (2006.01) |

(52) U.S. Cl.
CPC ............ *B60B 7/068* (2013.01); *B60B 7/0013* (2013.01); *B60B 7/04* (2013.01); *B60B 7/20* (2013.01); *B60B 7/14* (2013.01)

(58) Field of Classification Search
CPC .............. B60B 7/068; B60B 7/20; B60B 7/04
USPC ... 301/37.25, 37.35, 37.102, 37.105, 37.101, 301/35.625, 35.626, 35.62, 37.34, 37.31, 301/37.373, 37.374, 37.375, 37.376
See application file for complete search history.

(56) References Cited

U.S. PATENT DOCUMENTS

| | | | | |
|---|---|---|---|---|
| 2,130,220 | A * | 9/1938 | Ball | B60B 7/20 301/108.1 |
| 4,761,040 | A * | 8/1988 | Johnson | B60B 7/14 301/108.4 |
| 5,190,354 | A * | 3/1993 | Levy | B60B 7/20 301/37.25 |
| 5,290,094 | A * | 3/1994 | Gragg | B60B 7/20 301/37.108 |
| 6,536,848 | B1 * | 3/2003 | Goodman | B60B 7/20 301/37.21 |
| 6,945,609 | B2 * | 9/2005 | Barney | B60B 7/04 301/37.105 |
| 7,100,995 | B2 * | 9/2006 | Gilly | B60B 7/20 301/37.25 |
| 2007/0228807 | A1 * | 10/2007 | Leslie | B60B 7/0013 301/37.26 |
| 2008/0116736 | A1 * | 5/2008 | Freeman | B60B 7/20 301/37.25 |
| 2013/0076106 | A1 * | 3/2013 | Mooney | B60B 7/20 301/37.25 |
| 2014/0175850 | A1 * | 6/2014 | Roeglin | B60N 2/4606 297/411.38 |

* cited by examiner

*Primary Examiner* — S. Joseph Morano
*Assistant Examiner* — Jean Charleston
(74) *Attorney, Agent, or Firm* — Donn K. Harms

(57) ABSTRACT

A wheel center cap engagement system is provided to connect center caps of vehicle wheels to the proper position in a central area of the wheel. The center caps are connected to a mounting plate engageable with the wheel lugs and are held in proper positioning relative to the wheel thereby. A bearing can be interfaced between the center cap and its connection to the mounting plate should rotation of the center cap be desirable.

10 Claims, 5 Drawing Sheets

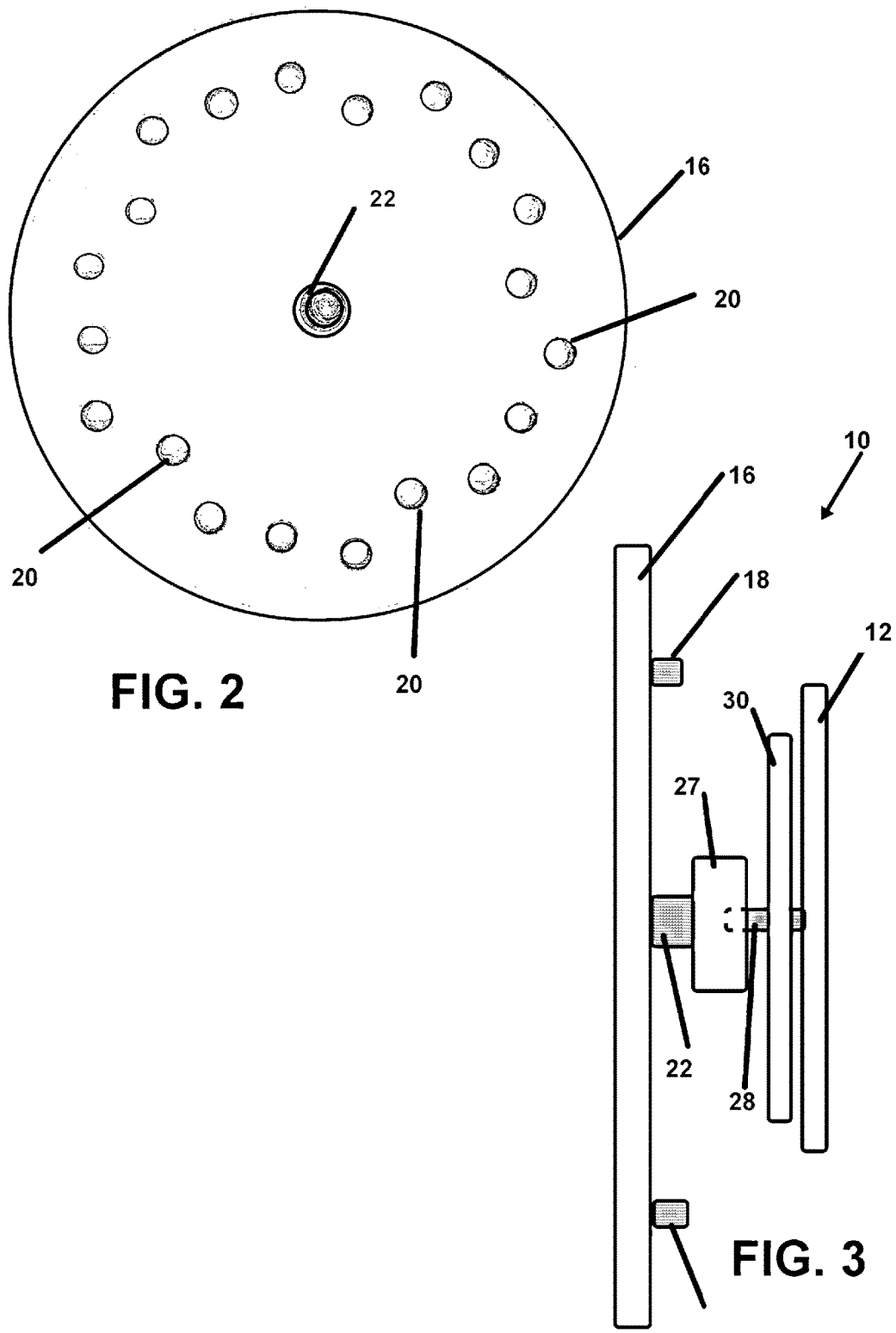

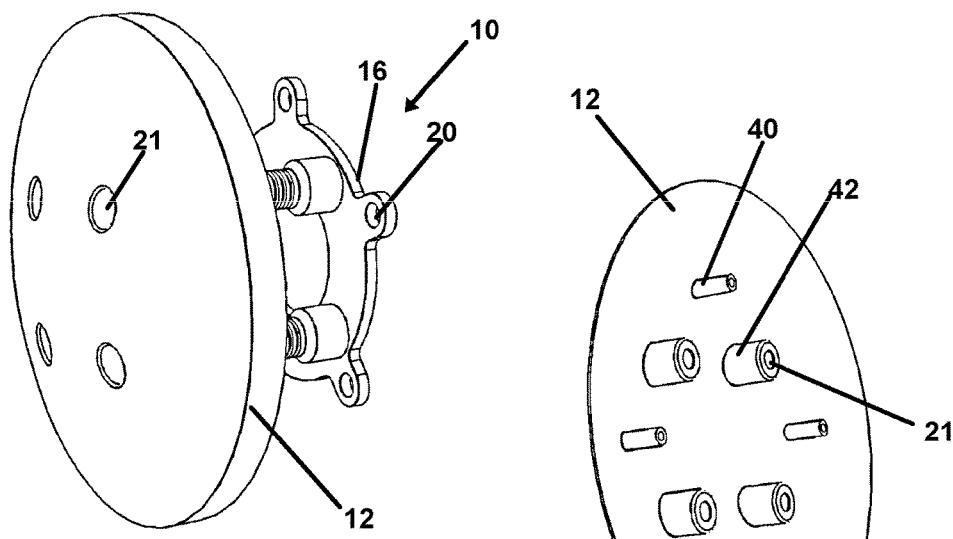
FIG. 4
FIG. 5
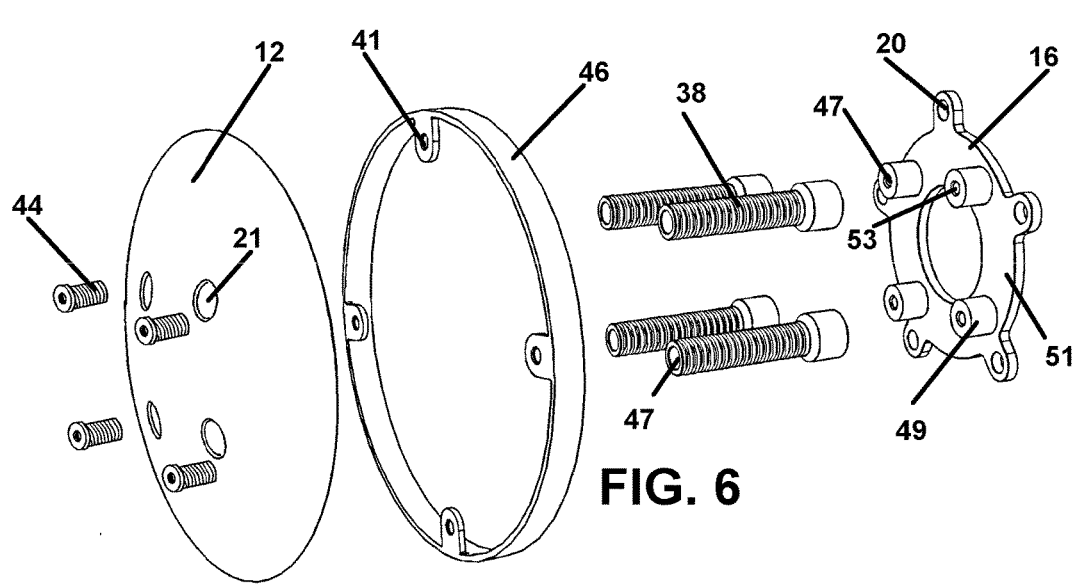
FIG. 6

VEHICLE WHEEL CENTER CAP ADAPTER

This application claims priority to U.S. Provisional Patent Application Ser. No. 62/074,527, filed on Nov. 3, 2015, which is incorporated herein in its entirety by this reference thereto.

BACKGROUND OF THE INVENTION

1. Field of the Invention

The present invention relates generally to lug-mounted vehicle wheels. More particularly, it relates to a center cap adapter for a vehicle wheel configured to adapt a stationary or a rotatable center cap, to a wide variety of vehicle wheels through the employment of an adapter plate having a plurality of apertures therethrough positioned to locate and engage a plurality of lugs in spacing of a plurality of different vehicle lug and wheel configurations.

2. Prior Art

New vehicles delivered to car lots which are sold to buyers conventionally have been delivered with hub caps or wheel center caps which engage to the wheel. Manufacturers generally place indicia on these wheel covers which bears their name, and/or the name of the car model to which the wheel hubcap or center cap is engaged.

Frequently car owners also purchase customized wheels for their vehicles for both decorative and performance purposes. In a similar fashion to that of the car manufacturers, such customized wheels also are supplied with center caps adapted to engage with the outer facing surface of the wheel when mounted on a vehicle.

While such new vehicles and newly purchased custom wheels bear an attractive appearance when new, over time vehicle wheels live a tortuous life on the road and are exposed to weather, jarring roadways, bumps, and other hazards which will result in the loss of one or more of the original wheel centers. Theft can also play a role in the loss of such decorative wheel covering components.

Because years can pass before a vehicle owner seeks to replace missing or old and less than decorative wheel center caps, problems arise. Frequently, the vehicle will still have two or three original centers but lack a full set. However, replacements for wheel center caps, which were manufactured years in the past, are hard or impossible to obtain in many cases.

Additionally, many drivers seek to upgrade the appearance of their vehicle with the purchase of new or customized wheel centers. However, because of the infinite number of wheel surface configurations sold and available for vehicle wheels, obtaining substitute or replacement center caps configured to fit the surfaces, shapes, and openings of a particular wheel or vehicle is at best, a challenge.

Still further, many vehicle owners, in upgrading their wheels, wish to engage rotating wheel center caps to their wheels. Such rotating centers have the ability to rotate freely irrespective of the rotation of the wheel itself. Some such rotating wheel centers are weighted to maintain the center itself, and indicia thereon, in a stationary positioning relative to a rotating wheel, so as to present the indicia thereon in a readable or viewable fashion at all times. Other rotating wheel centers are sought which will continue to rotate once the vehicle wheels stop doing so.

However, much like the problem with replacing wheel-face engaging wheel centers, the mounting of rotating wheel centers is plagued with the problem of dissimilar wheel lug nut spacing and patterns. Some vehicle wheels have lug patterns which engage five lugs in a particular spacing, while others will also engage five lugs but in a different spacing thereof around the wheel and from each other. Other wheels and vehicles may have six lugs and there can be multiple spacings and patterns of this number of lugs engaging wheels also. Trying to properly place replacement center caps properly positioned in the open central area of wheels, given the huge number of potential lug and wheel configurations, becomes more challenging as more wheels become available and as older wheels become obsolete.

The consequence of this is a severe limiting of the availability of replacement wheel center caps which might be engaged within the wheel openings because of the sheer number of lug configurations, wheel configurations, and lug spacings. Further when available, because the rotating or stationary wheel centers are customized to a particular wheel or lug bolt pattern, the cost can be prohibitive due to a lack of competition.

As such, there exists an unmet need for a wheel center cap mounting system, which provides a center cap engagement, which will engage replacement or existing wheel caps in a stationary or rotating wheel mount to a wide variety of wheels. Such a device should be adapted to engage multiple lug bolt patterns in multiple spacings and provide a secure mount which maintains the wheel balance once engaged. Such a device should be easily attached to vehicle wheel mounts and provide a stable fixed or rotating mount for a wide variety of wheel caps. Such a device and system should position the wheel caps in either a rotating or stationary centered positioning, over the formed space, gap, or recess at the center of a wheel to which they engage. Further, such a device should allow for re-fitment of new wheel center caps thereon easily, and having a mount which is adapted to multiple lug bolt patterns, it should be easily transferred to another vehicle from a first.

The forgoing examples of related art and limitations related therewith are intended to be illustrative and not exclusive, and they do not imply any limitations on the wheel center cap engagement invention and method described and claimed herein. Various limitations of the related art are already or will become apparent to those skilled in the art upon a reading and understanding of the specification below and the accompanying drawings.

SUMMARY OF THE INVENTION

The device and method herein disclosed and described provides a solution to the shortcomings in prior art of engagement and positioning of wheel center caps, either new or for replacement, on multiple vehicles and multiple wheel sizes with varying lug patterns and numbers.

The device herein engages the center cap properly positioned with the wheel, using a novel lug engagement plate which is employed to provide a solid mount for the wheel cap to a vehicle wheel. The engagement plate is configured with a plurality of apertures formed therethrough which are strategically placed in a spaced positioning to engage the intended wheel lugs.

In one mode the engagement plate will have a plurality of apertures equal to those of the intended wheel and spaced for a registered engagement of each of the plurality with one respective lug. In another mode there may be a plurality of apertures which is larger than the number of the intended wheel but where groups or clusters of the total number of apertures, will engage a plurality of wheel lugs, such as three.

Where mounting groups which are sub groups of a larger number of apertures in the mounting plate are provided, each mounting group of apertures positioned in a circular pattern in the body of the circular engagement plate is sized and spaced to operatively engage over, at least three lug bolts of a vehicle wheel, in a manner which centers a mounting pin located in the center of the engagement plate, over the center of the axle on which the engagement plate engages the lug bolts. Thus, the plate can be configured with groups of apertures which are spaced from each other in a fashion to all of the lugs or to match three lugs of axles which engage wheels in multiple numbers and patterns.

For instance the engagement plate can engage three lugs of the five in a five-lug engagement configuration, or can be positioned upon three lugs of a six-lug wheel pattern using a different group of operatively spaced apertures positioned around the center of the engagement plate. Thus, the engagement plate with a plurality of holes can be configured with multiple spaced groups of lug apertures and with diameters sized to operatively engage upon the three complimentary positioned lugs on a wheel axle. The result being that one engagement plate is configured for many different wheels and once so engaged, provides a common engaging system for the centered engagement of center caps to the projecting mounting pin or bolt from the engagement plate.

With the engagement plate properly centered on a wheel axle using the appropriate group of apertures communicating through the plate, in one mode of the device, a mounting pin or bolt projects from an engagement end at the center of the plate to a distal end positioned a distance from the facing surface of the plate. This mounting pin can be threaded to allow for the engagement thereon of multiple components such as a bearing or an interfacing component for a stationary center cap. This yields manufacturers a common base for their entire line of wheel covers and wheel center caps by an engagement to this projecting mounting pin which in a current preferred mode is threaded on an exterior to allow engagement of such components thereto.

For the engagement of rotating center caps, to the wheel to which the engagement plate is mounted, a bearing is engaged at a center axis to the mounting pin, which can be by a threaded axial cavity of the bearing. Thereafter the center cap can engage an exterior surface of the bearing such that the center cap will rotate irrespective of the rotation of the wheel to which the engagement plate is attached. By including weights engaged to the center cap or an interface component the center caps can be made to appear stationary in front of a rotating wheel. Alternatively, using a different weighting configuration, the center cap can continue to rotate when the wheel over which it engages is stopped.

Because of the commonality of the mounting pin for use to engage with bearings, center caps, interface components, and other components, a wide variety of configurations will be commonly available. Because the mounting plate has aperture groups sized and spaced to engage with multiple wheels with multiple lug sizes and/or spacing and patterns, the same, the mount can be used on a wide variety of vehicles with the same wheel center caps, or interchangeable wheel center caps allowing both users and manufacturers many more options than that noted in the current art.

The mounting plate as noted can also include a number and spacing of the lug apertures, to match that of the intended wheel. Additionally, instead of a single centered mount for the wheel center caps, a plurality of members engaged between the mounting plate and center cap can be employed. In this mode the distance of spacing of the center cap from the wheel can be adjusted by changing the length of the spacers. Additionally, should spinning center caps be desired, and bearing can be engaged between the wheel mount portion of the device, and the face of the place engaging the spacers. Such will allow the use of the spacer engagement for spinning center caps.

With respect to the above description, before explaining at least one preferred embodiment of the herein disclosed wheel center cap system and method in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other wheel cap engagement structures, methods and systems for carrying out the several purposes of the present disclosed device and method. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of the invention to provide a wheel cap mounting and engagement system which allows the same components to engage and fit upon multiple wheels with differing lug patterns, number, and size.

It is an object of the invention to provide such a wheel center cap system which provides a mount engageable to multiple wheel configurations with a common engagement system thereto for wheel center caps and components.

These and other objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the wheel center cap system and method herein. It is intended that the embodiments and figures disclosed herein are to be considered illustrative rather than limiting. In the drawings:

FIG. 2 shows a top plan view of a mode of the mounting plate, showing the plurality of apertures therein which are positioned in spaced groups which are configured to engage with multiple lug bolt patterns, numbers, and sizes.

FIG. 3 is a depiction of the various components of the system in a manner to show the centered inline engagement to the projecting pin from the mounting plate.

FIG. 4 shows another stationary mode of the device employing a mounting plate having apertures adapted in size, spacing and positioning, to engage over and upon the vehicle lugs, and having spacers projecting therefrom as a connector to the center cap.

FIG. 5 depicts a rear view of the center cap as could be used with the device of FIGS. 4-10 herein.

FIG. 6 shows an exploded view of the device of FIG. 4.

Figure 1:
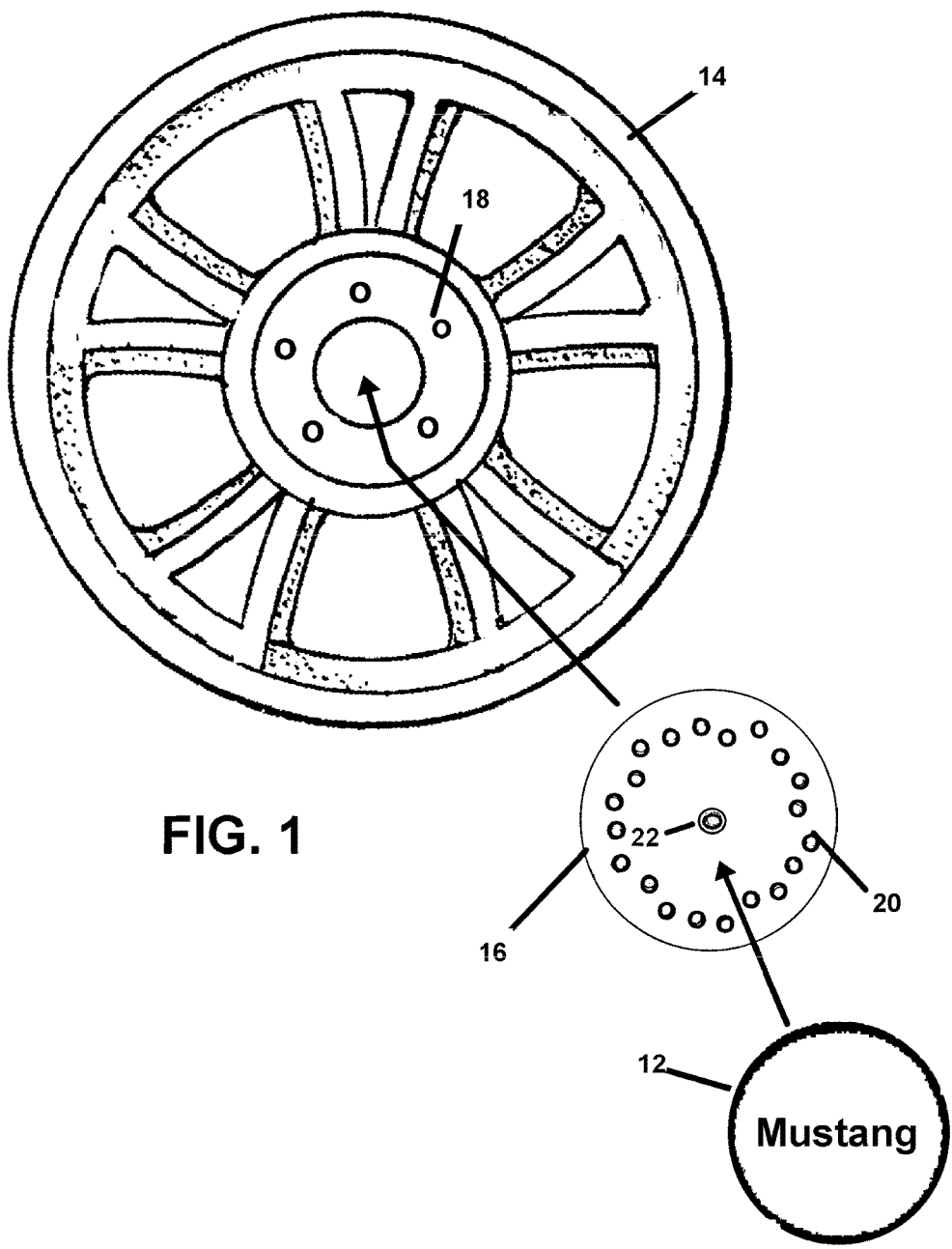
FIG. 1 shows a typical wheel which engages a plurality of lug bolts which communicate in a pattern through the wheel, and shows the engagement plate with multiple groups of apertures being positionable to engage one set to the lugs, and the center cap to the mount.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-10, wherein similar components are identified by like reference numerals, there is seen in FIG. 1, an exploded depiction of a mode of the center cap mounting system 10, herein for the engagement of wheel center caps 12 to a proper position on or adjacent multiple vehicle wheels 14, using a highly adaptive mounting plate 16 as an interface between the lugs 18 employed to mount a wheel 14, and the engaged mounting plate 12.

Shown in FIG. 1, is one mode of a mounting plate 16 which is adapted or configured with a plurality of apertures, spaced and sized to engage over and upon the lugs of wheels 14 conventionally used to mount the wheels 14 to an axle. As shown, the plurality of apertures 20 are formed to communicate through the mounting plate 16. As a connector to engage the center cap 12 to the mounting plate 16, and hold it in the proper registered engagement with the exposed surface of a wheel 14 engaged upon the lugs, a mounting pin 22 is shown projecting from a center point of the mounting plate 16 to a distal end.

As noted above, in this mode of the device 10 the apertures 20 are formed into mounting groups of apertures 20, which are sized and spaced from one another, such that they will engage over the lugs 18 which engage a wheel 14 to the vehicle, and allow three of the lugs 18 to communicate through the three spaced apertures 20 in a group. A nut can engage with each lug 18 operatively and against the mounting plate 16, and so engaged the connection for the center cap 12 to the mounting plate 16 is provided by the depicted mounting pin 22 on the axle holding the lugs 18.

The connection can be fixed between the mounting plate 16 and the wheel center cap 12, or a rotating of the mounting plate 16 shown in FIG. 3 can be used which positions different groups of apertures 20 in their respective spacing and size, such that one group can be matched to the lugs 18 of a desired wheel 14. To the mounting pin 22 is engaged either the center cap 12, or more preferably, other interface components shown in FIG. 3.

FIG. 2 shows a plan view of the mounting plate 16 having a plurality of apertures larger in number than the lugs 18 of the intended wheel in an enlarged view. In this view it depicts the apertures 20 formed radially through the mounting plate and around the mounting pin 22 which projects from the center point of the mounting plate 16. In this mode, a plurality of aperture groups are formed into the mounting plate 16 which feature three apertures 20 in a spacing from each other, to engage over three lugs 18 of a particular lug pattern used on vehicles.

Thus, by providing a larger number of apertures 20 than lugs 18, and positioning those in groups matching lug patterns, multiple lug patterns are accommodated with multiple spacings and number, by the operative positioning of respective multiple groups of apertures 20 in configurations to engage with multiple lug patterns. So engaged, the connector between the wheel center cap 12 and mounting plate 14 positions the center of the mounting plate 16 at the center of the wheel 14 having the particular lug pattern engaged.

As shown in FIG. 3, for example, once a respective group of apertures 20 is engaged over the lugs 18, nuts can be used to engage over the lugs 18 projecting through the mounting plate 16. This is true in all modes of the device 10 depicted herein.

Should spinning wheel center caps 12 be desirable, a bearing 27 may be included and is shown engaged to allow rotation of the center pin 22 and any connected wheel center cap 12. The center cap 12 is depicted in a rotational engagement to the bearing 27 using a bolt 28 or other means for engagement thereto, to allow the center cap 12 to rotate independent of the wheel 14 to which the mounting plate 16 engages it.

Also shown are a weight 30 shown as a secondary plate in FIG. 3, which can provide a weighted engagement of the center cap 12 to the bearing 27 and allow the center cap 12 to appear stationary, while the wheel 14 is spinning the mounting plate 16. Other configurations are also available as would occur to those skilled in the art and one skilled in the art could discover these upon reading this specification. The explication of the features of this invention does not limit the claims of this application and other applications developed by those skilled in the art using the system 10 herein, are intended to be included in this invention.

FIG. 4 shows another stationary mode of the device 10 employing a mounting plate 16 having apertures 20 adapted in spacing and number and diameter, to engage a similarly configured set of the vehicle lugs 18 (FIG. 3) therethrough which can then be engaged with nuts to hold the mounting plate 16. In this mode of the device 10 a connector is provided to hold the center cap 12 to the mounting plate 16. One preferred connector is a plurality of elongated members or spacers 38 which are configured to engage with a contact surface 51 of the mounting plate 16 at first ends, and with the wheel center cap 12 at opposing second ends. As noted below, using screws 44 of a length to communicate through the axial passages 47 of the spacers 38 and engage with a threaded portions 53 of the passages 47 in the spacer mounts 42, or in the mounting plate 16 if no mounts 32 are employed.

This mode of connector places engaging the center cap 12 to the mounting plate 16 compresses the spacers 38 between the center cap 12 and the mounting plate 16 centered over the center of the mounting plate 16. It works especially well because it allows for the adapting of the positioning of the center cap 12 to accommodate thinner and thicker wheels 14. To position the distance of the center cap 12 from the mounting plate 16 to register in the correct position for a center cap 12 for thinner or thicker wheels 14, the members forming the spacers 38 can be varied in length to properly position the wheel center cap 12 the correct distance from the mounting plate 16, and wheel 14 (FIG. 1).

Shown in FIG. 5 is a rear view of the center cap 12 shown in FIGS. 4-10. Depicted are cooperative connectors in the form of projections 40, which may be employed to engage with mating cooperative connectors shown in FIG. 6, as apertures 41 in a sidewall 46 employable between the wheel center cap 12 and mounting plate 16 if needed for a particular wheel configuration. A mating of the cooperative connectors will hold the sidewall 46 in place, and attached to the wheel center cap 12. Of course the sidewall 46 may also be formed as a unitary structure with the wheel center cap 12, but using an engageable sidewall 46 allows for different lengths thereof as well as the angle and shape thereof to allow the circumference of the wheel center cap 12, to better connect to the underlaying wheel 14, by using the appropriate width and angled sidewall 46 to the task.

FIG. 6 shows an exploded view of the device of FIG. 4, depicting the center cap connectors 44 employable to connect the wheel center cap 12 to either the distal ends of the spacers 38, such as screws mating with threaded portions 53 of the axial passages 47 in the spacers 38. Alternatively, and preferred, the cap connectors 44, can be longer than depicted and extend through the axial passage 47 running through the spacers 38, and engage with mating connectors attached to the mounting plate 16, such as a threaded portion of the axial passages 47 of spacer mounts 49 projecting from the contact surface 51 of the mounting plate 16. Contact between the cap connectors 44 and the wheel center cap 12 can be a circumferential edge of the apertures 21 in the wheel center caps 12 and a first end of the cap connectors 44 such as the head of a screw.

Figure 7:
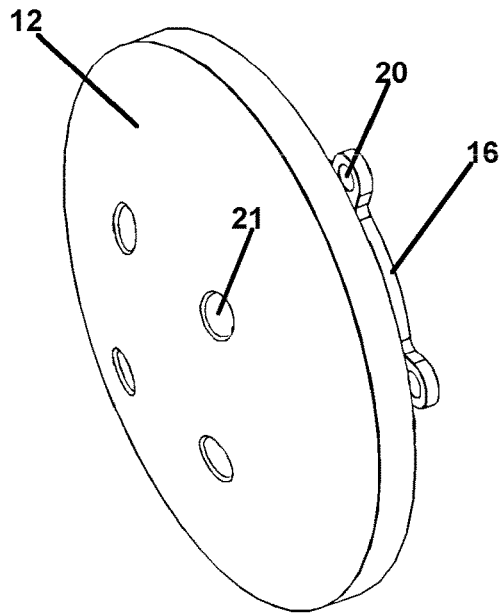
FIG. 7 is a perspective view of the device herein similar to that of FIG. 4, but configured for a spinning or floating engagement of the center cap.

FIG. 7 is a perspective view of the device 10 herein similar to that of FIGS. 4-6, but configured for a spinning or floating engagement above the wheel 14 by a rotating connection of the center cap 12 with the mounting plate 16. A rear view of this mode of the device 10 of FIG. 7 is shown in FIG. 8.

Figure 8:
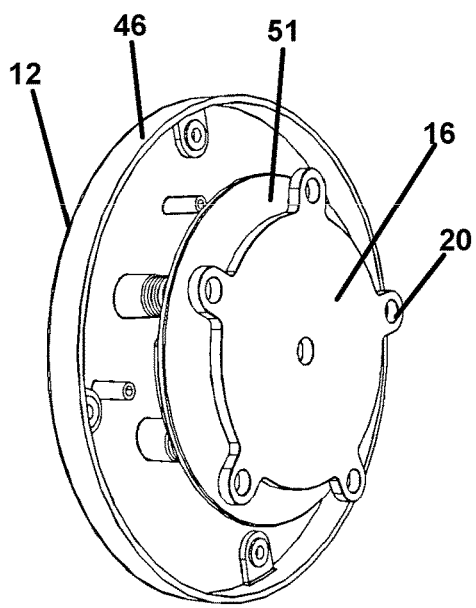
FIG. 8 is a perspective rear view of the assembly of the device herein shown in FIGS. 7 and 9.
Figure 9:
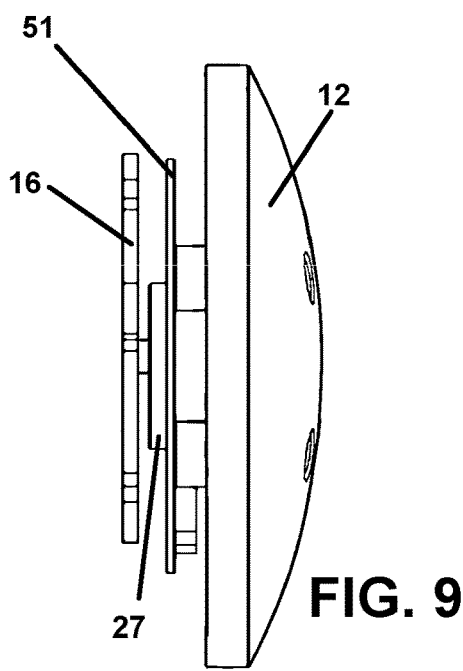
FIG. 9 is a side view of the device of FIG. 7 showing the arrangement of engaged components.

FIG. 9 is a side view of the device 10 as in FIG. 7 and showing the arrangement of engaged components of the assembly of wheel center cap 12 and mounting plate 16. Also shown are the sidewall 46 which as noted can be a separate component or as in FIG. 8, engaged to the wheel center cap 12 as described above.

Should a rotating wheel center cap 12 be desirable, as noted above, a bearing 27 may be positioned between the mounting plate 16, and a contact surface 51 for the spacers 38, if the contact surface 51 is not upon the mounting plate 16 itself as in the mode of FIGS. 4-6.

Figure 10:
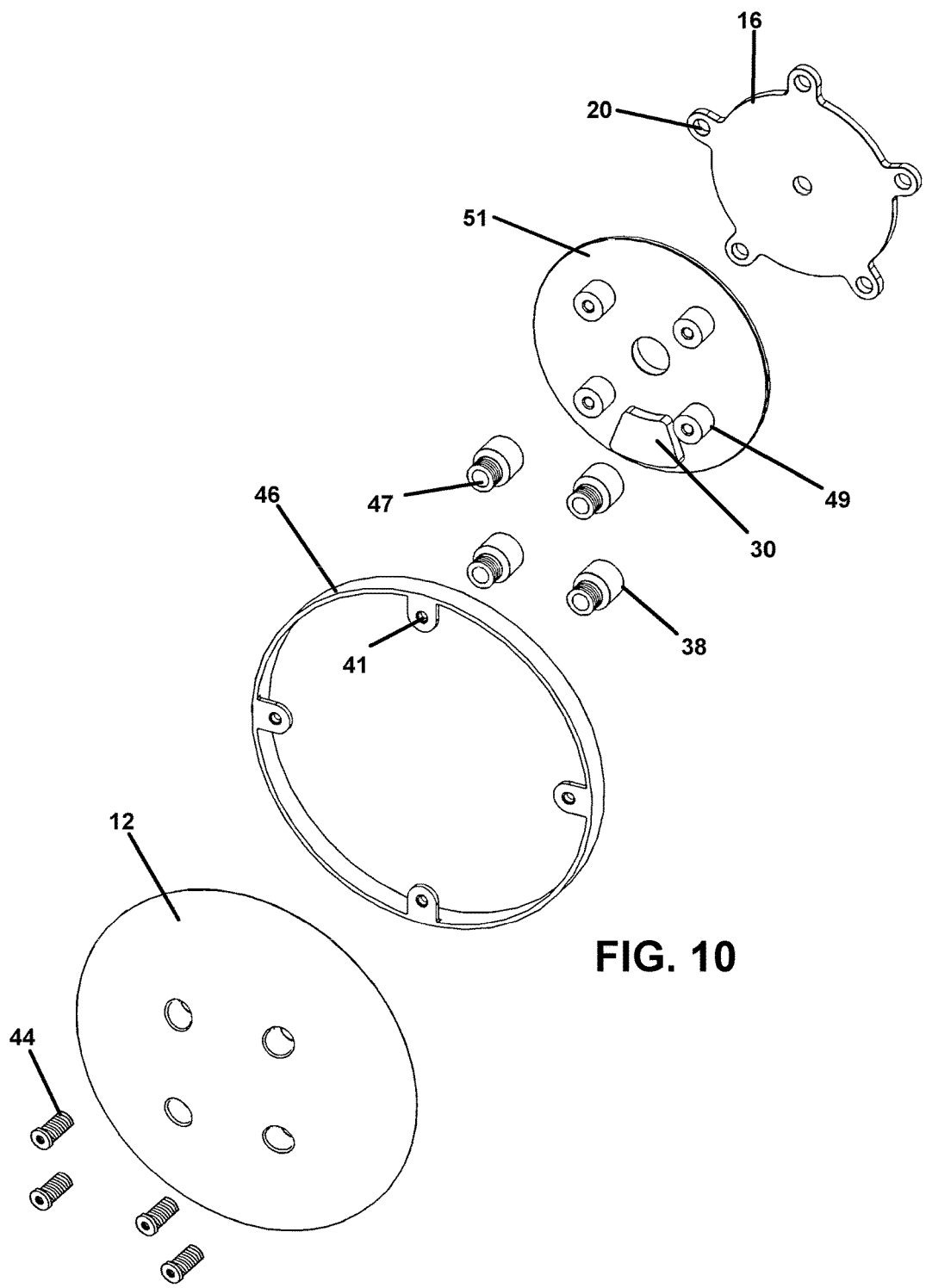
FIG. 10 shows an exploded view of the device of FIGS. 7-9.

FIG. 10 shows an exploded view of the device of FIGS. 7-9 and depicts a weight 30 positioned upon the contact surface 51 to which the spacer mounts 42 are engaged. The contact surface 51 is engaged to the bearing 27 (FIG. 9) which is engaged to the mounting plate 16 using a bolt or similar means for engagement thereto. As noted earlier, the weight 30 will tend to maintain the wheel center caps 12 stationary as the wheel 14 rotates. The other components described in FIGS. 7-9 are also shown.

It is additionally noted and anticipated that although the device 10 is shown in the noted preferred modes, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the wheel center cap engagement system and method of employment have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A wheel center cap engagement apparatus, comprising:
    a mounting plate, said mounting plate adapted to engage upon a plurality of lugs communicating through a wheel to the wheel to a vehicle axle;
    a center cap, said center cap configured to register in a mounted position, covering a central area of said wheel; and
    at least one connector communicating between said center cap and a mounting surface of said mounting plate to hold said mounting plate in said mounted position; and
    a sidewall engageable to said mounting plate, said sidewall extending from a circumference of said mounting plate for a distance toward said mounting plate with said center cap in said mounted position.

2. The wheel center cap engagement apparatus of claim 1 wherein a bearing is engaged between said mounting surface and said mounting plate; and
    said connector is engaged between said center cap and said mounting surface, wherein said center cap being rotatable when in said mounted position.

3. The wheel center cap engagement apparatus of claim 1 additionally comprising:
    said connector including a plurality of members forming a plurality of said connectors;
    a plurality of screws, each said screw engaged through a respective aperture formed in said center cap, to a threaded connection with a mounting surface of said mounting plate;

said plurality of members held in a sandwiched engagement compressed between said mounting surface and said center cap by said plurality of screws in said threaded connection.

4. A wheel center cap engagement apparatus, comprising:
a mounting plate, said mounting plate adapted to engage upon a plurality of lugs communicating through a wheel to the wheel to a vehicle axle;
a center cap, said center cap configured to register in a mounted position, covering a central area of said wheel; and
at least one connector communicating between said center cap and a mounting surface of said mounting plate to hold said mounting plate in said mounted position;
said mounting plate is adapted to engage upon said plurality of lugs by a plurality of apertures communicating through said mounting plate;
said apertures having a diameter sized for passage of said lugs therethrough;
said apertures in a spacing complimentary to a spacing of said lugs;
a sidewall engageable to said mounting plate, said sidewall extending from a circumference of said mounting plate for a distance toward said mounting plate with said center cap in said mounted position.

5. The wheel center cap engagement apparatus of claim 4 wherein a bearing is engaged between said mounting surface and said mounting plate; and
said connector is engaged between said center cap and said mounting surface, wherein said center cap being rotatable when in said mounted position.

6. The wheel center cap engagement apparatus of claim 5 additionally comprising:
said connector including a plurality of members forming a plurality of said connectors;
a plurality of screws, each said screw engaged through a respective aperture formed in said center cap, to a threaded connection with a mounting surface of said mounting plate;
said plurality of members held in a sandwiched engagement compressed between said mounting surface and said center cap by said plurality of screws in said threaded connection.

7. The wheel center cap engagement apparatus of claim 4 additionally comprising:
said connector including a plurality of members forming a plurality of said connectors;
a plurality of screws, each said screw engaged through a respective aperture formed in said center cap, to a threaded connection with a mounting surface of said mounting plate;
said plurality of members held in a sandwiched engagement compressed between said mounting surface and said center cap by said plurality of screws in said threaded connection.

8. A wheel center cap engagement apparatus, comprising:
a mounting plate, said mounting plate adapted to engage upon a plurality of lugs communicating through a wheel to the wheel to a vehicle axle;
a center cap, said center cap configured to register in a mounted position, covering a central area of said wheel; and
at least one connector communicating between said center cap and a mounting surface of said mounting plate to hold said mounting plate in said mounted position;
a bearing is engaged between said mounting surface and said mounting plate; and
said connector is engaged between said center cap and said mounting surface, wherein said center cap being rotatable when in said mounted position.

9. The wheel center cap engagement apparatus of claim 8 additionally comprising:
said connector including a plurality of members forming a plurality of said connectors;
a plurality of screws, each said screw engaged through a respective aperture formed in said center cap, to a threaded connection with a mounting surface of said mounting plate;
said plurality of members held in a sandwiched engagement compressed between said mounting surface and said center cap by said plurality of screws in said threaded connection.

10. A wheel center cap engagement apparatus, comprising:
a mounting plate, said mounting plate adapted to engage upon a plurality of lugs communicating through a wheel to the wheel to a vehicle axle;
a center cap, said center cap configured to register in a mounted position, covering a central area of said wheel; and
at least one connector communicating between said center cap and a mounting surface of said mounting plate to hold said mounting plate in said mounted position;
said connector including a plurality of members forming a plurality of said connectors;
a plurality of screws, each said screw engaged through a respective aperture formed in said center cap, to a threaded connection with a mounting surface of said mounting plate;
said plurality of members held in a sandwiched engagement compressed between said mounting surface and said center cap by said plurality of screws in said threaded connection.

* * * * *